United States Patent [19]

Nakayama

[11] Patent Number: 4,979,139
[45] Date of Patent: Dec. 18, 1990

[54] ARITHMETIC UNIT FOR EXPONENTIAL FUNCTION

[75] Inventor: Misayo Nakayama, Tokyo, Japan
[73] Assignee: NEC Corporation, Tokyo, Japan
[21] Appl. No.: 311,171
[22] Filed: Feb. 15, 1989
[30] Foreign Application Priority Data Feb. 17, 1988 [JP] Japan .................................. 63-35902

[51] Int. Cl.$^5$ ........................... G06F 7/38; G06F 7/52
[52] U.S. Cl. ............................... 364/715.01; 364/754; 364/761
[58] Field of Search .................... 364/715.01, 735, 736, 364/748, 754, 761, 768

[56] References Cited

U.S. PATENT DOCUMENTS 4,817,047 3/1989 Nishitani et al. ..................... 364/736

Primary Examiner—Gary V. Harkcom
Assistant Examiner—Long T. Nguyen
Attorney, Agent, or Firm—Helfgott & Karas

[57] ABSTRACT

An arithmetic unit for carrying out sequentially arithmetic pseudo division and reverse-sequentially pseudo multiplication according to algorithm based on Sequential Table Look-up method utilizing constant values $2^k \times \log e(1+2^{-k})$ so as to calculate value of exponential function $e^x - 1$ for a given value x comprises a generator which generates the constant values $2^k \times \log e(1+2^{-k})$ from $k=0$ to $k=m-1$ where m is a positive integer number, an adder-subtracter controlled to selectively carry out arithmetic addition and subtraction, an output register connected to receive and store the result from the adder-subtracter and a barrel shifter is connected to the output register for right-shifting a content thereof by shift bit count k. The input registers are connected to the adder-subtracter. One of the input registers is connected to the output register to receive its updated content and the other input register is connected to the generator for receiving therefrom the constant value $2^k \times \log e(1+2^{-k})$ during the pseudo division and to the barrel shifter for receiving therefrom the right-shifted content of the output register during the pseudo multiplication. A stacker is connected to the output register for stacking in First-In, Last-Out basis sign bit of the contents of the output register and is adapted to control the adder-shifter.

4 Claims, 3 Drawing Sheets

ARITHMETIC UNIT FOR EXPONENTIAL FUNCTION

BACKGROUND OF THE INVENTION

The present invention relates to an arithmetic unit for exponential function utilized in a computer.

Exponential calculation is one of the necessary functions for computers of the type carrying out scientific and technological computation. The calculation methods of exponential function include a method utilizing Taylor series expansion:

$$e^x - 1 = x + x^2/2! + x^3/3! + \ldots + x^n/n! \ldots \quad (1)$$

and a method according to meromorphic function approximation using continued fraction expansion or Tchebycheff series expansion. However, these methods have drawbacks that they need a relatively long calculation time due to frequent repetition of multiplication and division and they do not provide a sufficient calculation precision.

Further, there is another calculation method for exponential function of Sequential Table Look-Up (hereinafter, referred to as "STL") which is suitable for micro-program-controlled computer. Since the STL method can be carried out by adding operation, substracting operation and right-shifting operation, this method is efficient for use in computers which have no fast multiplier unit.

Arithmetic principle of the STL method is explained hereinbelow for calculating an exponential function according to binary notation with the precision of n bits. In this method, the input value x is represented by using a constant number $\gamma_k$ and a series $\{a_k\}$ as follows:

$$x = a_0 x \gamma_0 + a_1 x \gamma_1 + a_2 x \gamma_2 + \ldots + a_{n-1} x \gamma_{n-1} + \epsilon \quad (2)$$

where
$$\gamma_k = \log_e(1 + 2^{-k}) \quad (3)$$
$$a_k = \{+1, 0\} \quad (4)$$

Accordingly, the exponential function $e^x - 1$ is represented by the following relation:

$$e^x - 1 = (1 + 2^{-1})^{a_1} x (1 + 2^{-2})^{a_2} \ldots$$
$$x(1 + 2^{-(n-1)})^{a_{n-1}} x(2^\epsilon - 1) \quad (5)$$

In this method, determination of the series $\{a_k\}$ from the input value x it called pseudo division, and determination of the value of exponential function $e^x - 1$ from the series $\{a_k\}$ is called pseudo multiplication.

The above-mentioned determinations include the following operation steps for the number sequential k.

$$W = \phi_k - \gamma_k \quad (6)$$

If $W \geq 0$, $$a_k = +1 \quad (7)$$
$$\phi_{k+1} = W \quad (8)$$
$$\epsilon_{k+1} = \epsilon_k + 2^{-k} x \epsilon_k \quad (9)$$

If $W < 0$ $$a_k = 0 \quad (10)$$
$$\phi_{k+1} = \phi_k \quad (11)$$
$$\epsilon_{k+1} = \epsilon_k \quad (12)$$

By repeatedly carrying out these steps, the value of $\phi_k$ approaches to zero to thereby obtain the value of exponential function $e^x - 1 = \epsilon_k - 1$.

In these operation steps, the relation (6) represents the pseudo division for determining the series $\{a_k\}$, and the relations (8), (9), (11) and (12) represent the pseudo multiplication for determining the value of $e^x$ from the series $\{a_k\}$.

In these operations, the algorithm of STL method is represented as follows.

1. The initial values $x_o = x (1 \leq x < \log_e 2)$ and $y_o = 1$ are set.
2. The following operation 3 is repeatedly carried out for the number $k = 0, 1, 2, \ldots, n-1$.

3.

$$W = x_k - \gamma_k \quad (13)$$

If $W \geq 0$, $$a_k = +1 \quad (14)$$
$$x_{k+1} = W \quad (15)$$
$$y_{k+1} = y_k + y_k x 2^{-k} \quad (16)$$

If $W < 0$, $$a_k = 0 \quad (17)$$
$$x_{k+1} = x_k \quad (18)$$
$$y_{k+1} = y_k \quad (19)$$

where the number $\gamma_k$ is a constant value satisfying the relation (3).

4. The value of exponential function $e^x - 1$ is obtained as the value $y_n - 1$.

The conventional algorithm of STL method is effected by an arithmetic unit shown in FIG. 2 according to the procedure illustrated in flow chart of FIG. 3 Referring to FIG. 2, the arithmetic unit includes a pair of shift registers 207 and 208 which store two kinds of binary variables $x_k$ and $y_k$, respectively, a barrel shifter 203 which carries out the right shift operation by a given shift bit count, an n-word ROM 202 of n words for generating the constant number $\gamma_k$ defined by the relation (3), and an adder-subtracter 204 for adding or substracting the content of an input port A and content of an input port B to or from each other. A counter 206 is provided to control loop cycle number, and another counter 201 is provided to designate the shift bit count k in the barrel shifter 203 and to designate the integer number k for addressing the ROM 202.

Next, the operation of arithmetic unit shown in FIG. 2 is explained in conjunction with the algorithm of STL method illustrated in FIG. 3.

1. For the initialization, the register 207 is set with the initial value $x_o = x$ (step 301), the register 208 is set with the initial value $y_o = 1$ (step 302), the counter 201 is set with the sequential number $k = 0$ (step 304), and the counter 206 is set with the desired loop cycle number n which corresponds to the bit number of exponential function value to be determined (step 303).

2. The following loop procedure 3 is repeatedly carried out n times according to the decrement of content of the counter 206 from n to 1.
3. Before the k-th loop procedure the register 208 has been stored with the variable $y_k$ determined by the relation (16) or (19), the register 207 has been stored with the variable $x_k$ determined by the relation (15) or (18), the register 205 has been stored with the variable W determined by the relation (13), the counter 201 has been set to the sequential number k and the counter 206 has been set to the number n.

During the k-th loop procedure, the barrel shifter 203 operates to right-shift binary data fed from a data bus 209 by a shift bit count k indicated by the counter 201 to thereby multiply the data by $2^{-k}$, and operates to return the multiplied data to the data bus 209. In the step 305, the variable $x_k$ stored in the registor 207 is transferred to the input port A of the adder-subtracter 204, and the constant value $\gamma_k$ stored in the address of ROM 203 designated by the sequential number k set in the counter 201 is transferred to the input port B of the adder-subtracter 204 The adder-subtracter 204 substracts the constant value $\gamma_k$ from the variable $x_k$ to calculate $W = x_k - \gamma_k$, and the calculated result W is transferred to the register 205.

In the step 306, if the value of sign bit is positive or $W > 0$ in the register 205, the following operation is carried out. Firstly, the content of the register 205, i.e., the fore mentioned calculation result W is transferred to the register 207 (step 311) whereby the update variable $x_k$ is set to W. Next, the variable $y_k$ stored in the register 208 is transferred to the input port A of the adder-subtracter 204. At the same time, the barrel shifter 203 right-shifts the variable $y_k$ by the shift bit count k indicated by the counter 201 to thereby obtain the value $y_k \times 2^{-k}$ and transfers the same to the input port B of the adder-subtracter 204 The adder-subtracter 204 adds the values $y_k$ and $y_k \times 2^{-k}$ to each other to carry out the calculation $y_{k+1} = y_k + y_k \times 2^{-k}$. The calculated result is transferred to the register 208 to update its content to $y_{k+1} = y_k + y_k \times 2^{-k}$.

On the other hand, in the step 306, if the value of sign bit is negative or $W < 0$, the contents of the registers 207 and 208 are not changed, i.e., $x_{k+1} = x_k$ and $y_{k+1} = y_k$, respectively (steps 321 and 322).

Then, the sequential number k of the counter 201 is updated to $k+1$ (step 307), and the content n of the counter 206 is updated to $n-1$ (step 308), and procedure returns to the step 305 with the sequential number $k+1$.

4. The above-described loop procedure is repeated n times until the content of register 206 becomes zero (step 309), and finally the content $y_n$ of the register 208 approaches to $y_n = e^x$, thereby obtaining the value of $e^x - 1$ by substracting 1 from $y_n$ (step 310).

The above procedure has been carried out conventionally by micro program. In such method, if one loop procedure 3 requires $\alpha$ number of clocks, the whole calculating procedure requires $n\times\alpha$ number of clocks and therefore spends a great amount of calculation time.

The above-described conventional arithmetic unit for exponential function has the following drawbacks. Firstly, the precision of calculation result is not good. Namely, since the constant value $\gamma_k$ defined by the relation (3) becomes small in accordance with the increment of sequential number k, significant figure of the constant value $\gamma_k$ is decreased and the rounding error is accumulated about the least significant bit (LSB). Further, since calculation of the relations (8), (9), (11) and (12) is based on the algorithm with fixed point number, if the variable x and value of the exponential function $e^x - 1$ are represented by floating point number, the variable x has to be converted into the fixed point number to calculate the value of $e^x - 1$ and then the value of $e^x - 1$ of the fixed point number has to be converted into the floating point number. In such case, if the variable x has a very small value, the significant figures are considerably reduced through the conversion into the fixed point number.

Secondly, the conventional method requires a considerably long calculation time. Namely, since the process of STL method (based on the arithmetic relations (6), (8), (9), (11) and (12)) is carried out entirely by micro program, if one loop procedure of the STL method requires $\alpha$ number of clocks, the whole procedure requires $n\times\alpha$ number of clocks, resulting in a considerably long calculation time.

SUMMARY OF THE INVENTION

An object of the present invention is, therefore, to provide a fast arithmetic unit for calculating the value of exponential function with a desired precision based on a modified STL method. According to the present invention, the new arithmetic unit for exponential function is comprised of a generator for generating constant values of $2^k \times \log_e(1+2^{-k})$ or $\log_e(1+2^{-k})$ (where sequential number $k = 0, 1, \ldots, m-1$) sequentially from $k=0$ to $k=m-1$, a first register, a second register, a barrel shifter for right-shifting the content of second register by a shift bit count of k (where $k=1, 2, \ldots m-2, m-1, m$), an adder-subtracter for adding to or substracting from the content of first register, the content of barrel shifter, the value of zero or the constant value generated by the generator and for outputting the thus calculated result into the second register, and a stacker of the m-stage first-In Last-Out type receptive of a sign bit from the second register for controlling the adder-shifter to selectively operate the arithmetic addition or transfer of data.

Hereinafter, arithmetic principle of the present invention is explained in conjunction with the arithmetic relations for calculating the value of exponential function. The inventive arithmetic principle is similar to that of the STL method, and the inventive algorithm is a modification of the STL algorithm. The pseudo division and pseudo multiplication are concurrently carried out in the conventional STL method, whereas the pseudo division is first carried out and thereafter the pseudo multiplication is carried out according to the present invention.

In the conventional STL method, since the error $\epsilon$ of the relation (2) is neglected and the pseudo multiplication is carried out with setting the initial value $y_0 = 1$, n number of loop procedure is needed to obtain the binary, n-digit precision.

On the other hand, according to the present invention, in view of the fact that since $\epsilon$ is smaller than $2^n$ according to the relation (2), if the calculation is carried out with binary 2n-digit of precision, $e^\epsilon$ is approximately equal to $\epsilon$ according to the relation (1), the pseudo multiplication is carried out with setting this value for initialization. For this reason, the total number of steps needed for the pseudo division and multiplication is about n as in the case of the conventional STL method. In order to use remainder $Y_m$ of the pseudo division as the initial set value of the pseudo multiplication with good precision, the pseudo division is carried out with shifting $X_k$ to lower order side by one bit each step. Further, the pseudo multiplication is carried out by reverse sequence with shifting $Y_k$ to upper order side by one bit each step.

In carrying out the pseudo multiplication, the initial value is set to $Y_m = \epsilon = X_k$ and the calculation step is repeated from $k = m$ to $k = i+1$ as shown in the following relation:

$$Y_{k-1} = Y_K + 2^{-k} x Y_{k+1} \tag{20}$$

As described above, since $e^x = X$ when x and y are floating point number and $x \ll 1$, the pseudo division is started from an intermediate step, and the pseudo multiplication is terminated at an intermediate step. As a result, reduction of significant bits due to bit adjustment can be prevented considerably and the performance of arithmetic unit can be improved.

Hereinafter the algorithm according to the present invention is explained The calculated result is assumed to have the precision of binary n (=2 m) digits 1. To determine the value of $e^x - 1$, the given value of variable x $(0 \leq x < +\infty)$ is inputted into the arithmetic unit.
2. The value of x is converted into the floating point representation $x = 2^{-i} x X$ $(1 \leq X < 2,$ i:integer number) to determine the complement i and mantissa X and the initial value is set to $x_i = X$.
3. The pseudo division is carried out by repeating the following step 4 for the sequential number $k = i, i+1, i+2, \ldots, m-1$.
4.

$$W = X_k - \tau_k, \text{ where } \tau_k = 2^k x \log_e(1 + 2^{-k}) \tag{21}$$

If $W \geq 0$, $$a_k = +1 \tag{22}$$

$$X_{k+1} = 2xW \tag{23}$$

If $W < 0$, $$a_k = 0 \tag{24}$$

$$X_{k+1} = 2xX_k \tag{25}$$

5. The initial value $Y_m$ for the pseudo multiplication is set as follows:
$$Y_m = X_m \tag{26}$$

6. The pseudo multiplication is carried out by reverse sequentially repeating the following step 7 for sequential number $k = m, m-1, m-2, \ldots, i+1$.
7. If $a_k = +1$, $$Y_{k-1} = (Y_k + 2^k x Y_{k+1})/2 \tag{27}$$

If $a_k = 0$, $$Y_{k-1} = Y_k/2 \tag{28}$$

8. The value of exponential function is determined as $e^x - 1 = Y_i$.

DESCRIPTION OF THE PREFERRED EMBODIMENTS

Figure 1:
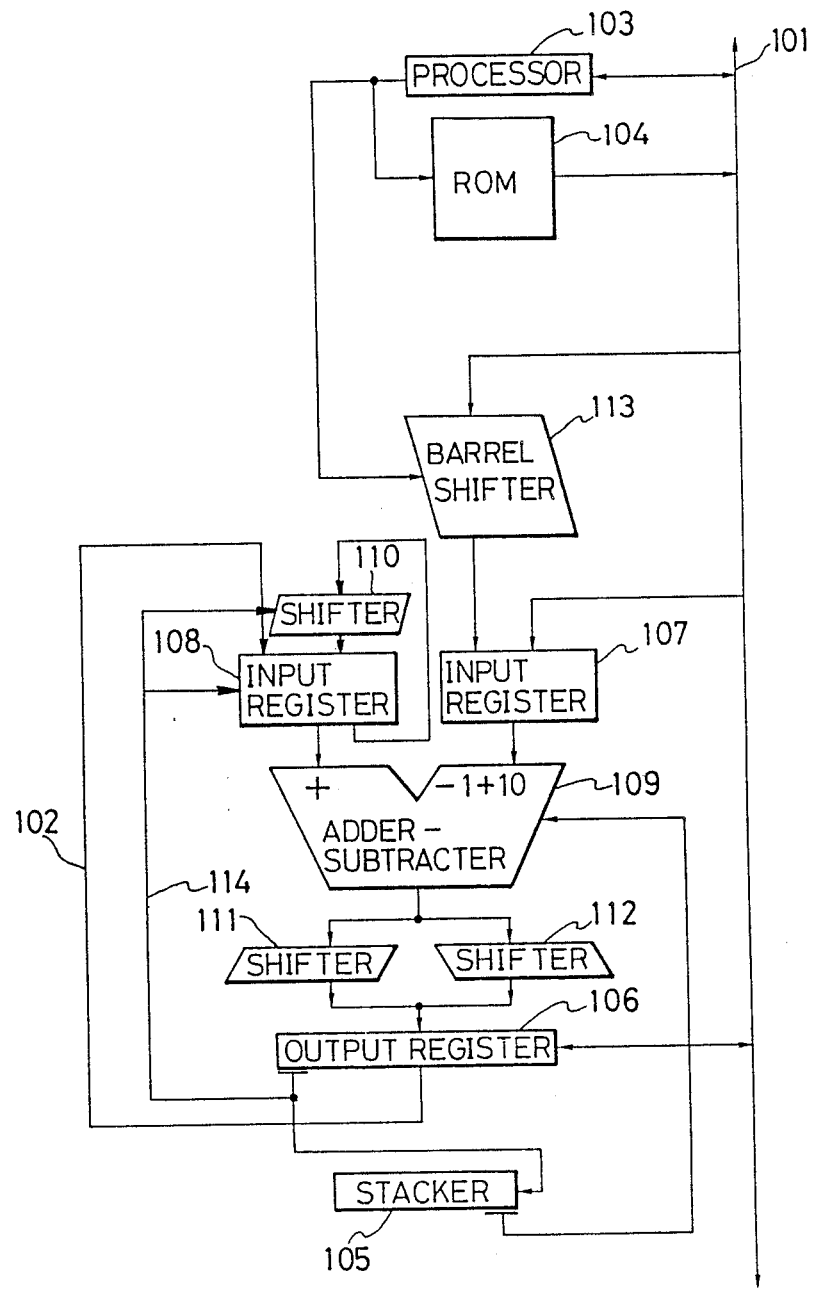
FIG. 1 is a circuit block diagram showing one embodiment of the arithmetic unit for exponential function according to the present invention.
Figure 2:
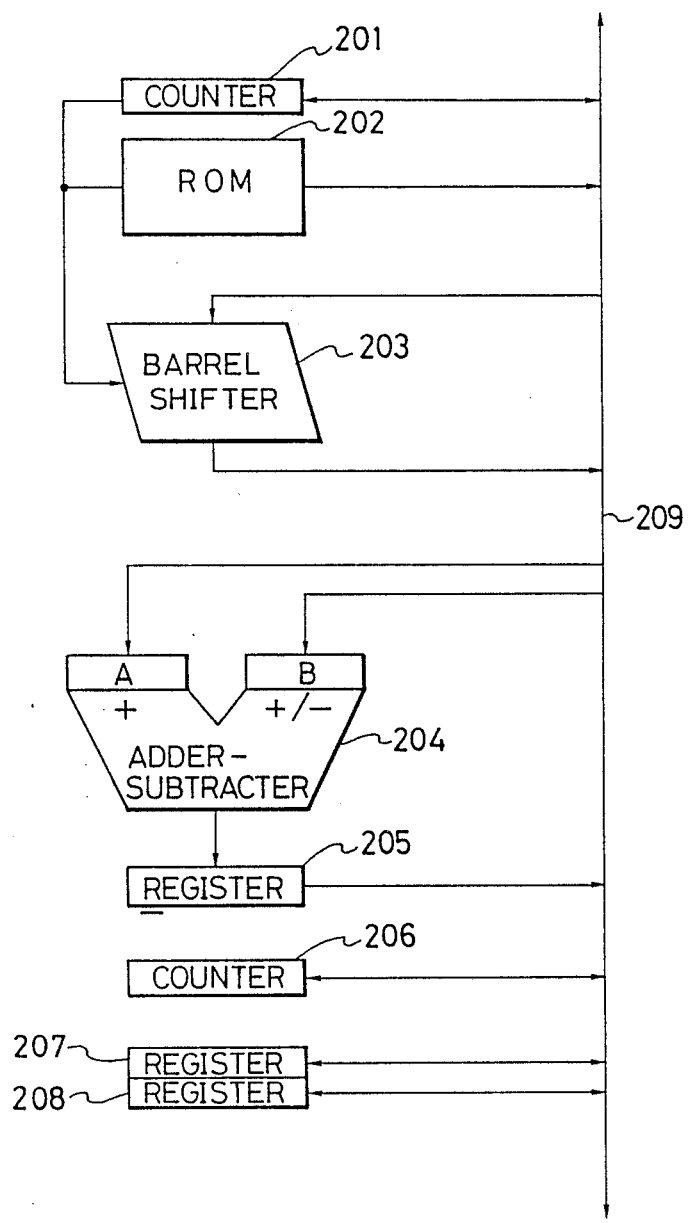
FIG. 2 is a circuit block diagram showing the conventional arithmetic unit for exponential function.
Figure 3:
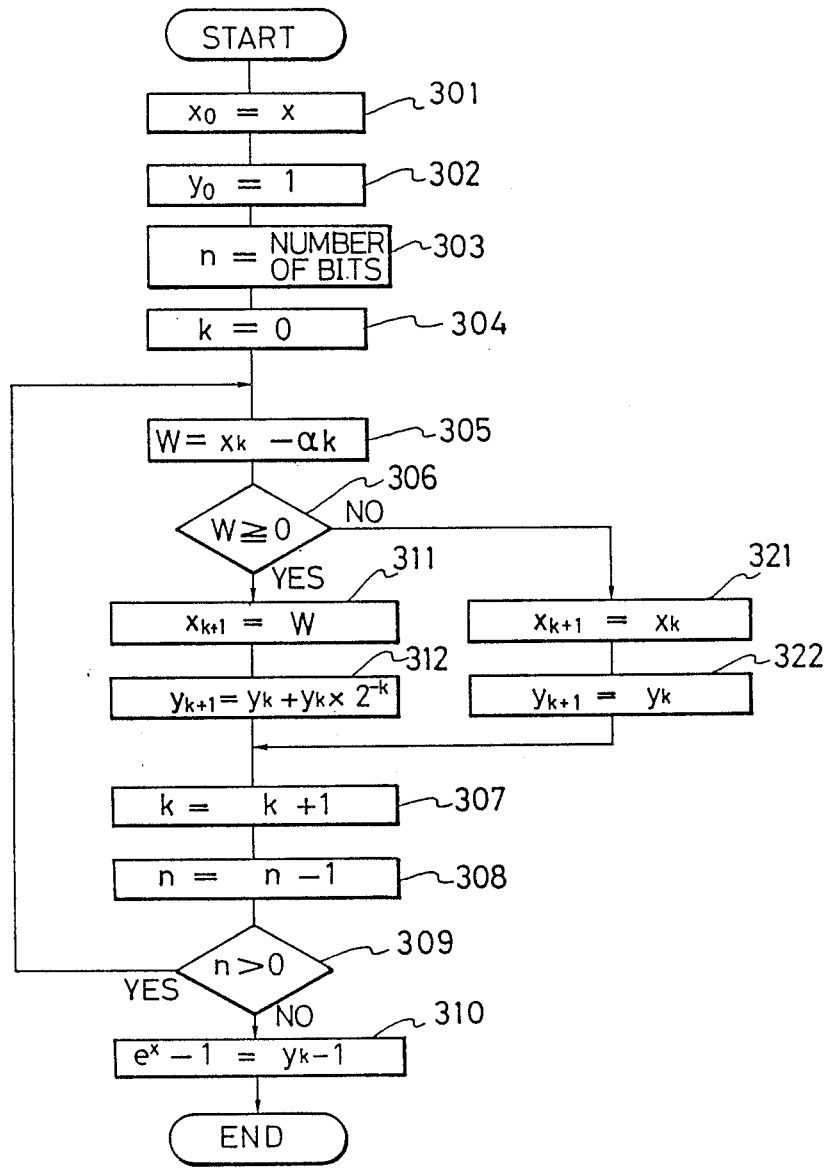
FIG. 3 is a flow chart showing the operation procedure of the conventional arithmetic unit shown in FIG. 2.

Hereinafter, embodiments of the present invention is explained in conjunction with the drawings. FIG. 1 shows a first embodiment of the arithmetic unit for calculating the value of exponential function $e^x - 1$ according to the present invention.

Referring to FIG. 1, the arithmetic unit includes registers 106 and 108 for storing two kinds of variables, an adder-subtracter 109 for carrying out arithmetic addition and substraction according to the relations (21) and (7), a barrel shifter 113 for right-shifting the content of register 106 by a given shift bit count, a one-bit shifter 112 for multiplying the output data from the adder-subtracter 109 by factor $\frac{1}{2}$ to output the result into the register 106, and another one-bit shifter 111 for multiplying the output data from the adder-subtracter 109 by factor 2 to output the result into the register 106. An m-word ROM 104 is provided to store the constant value $\tau_k$ defined by the relation (21), a processor 103 is provided to control the shift bit count of the barrel shifter 113 and the addressing of the ROM 104 so as to calculate exponent part, and a stacker 105 of the First-In, Last-Out type is provided to stack the series $\{a_k\}$ and to control the adder-subtracter 109 to selectively carry out the adding operation and transferring operation. A bus 101 is connected to transfer input and output data and intermediate results of the arithmetic operation.

Next, the operation of arithmetic unit shown in FIG. 1 is explained according to the inventive algorithm.

1. The value of variable x represented in the binary floating point number $(0 \leq x < +\infty)$ is inputted into the bus 101, and the processor 103 receives the inputted value x and calculates the complement i of exponent part determined when the variable x is represented in the form of $x = 2^{-i} x X$ $(1 \leq X < 2,$ i: integer number).
2. The mantissa X of inputted variable x is stored in the output register 106 as the initial value $X_i = X$.
3. The pseudo division is carried out by repeating the following step 4 in response to increment of the sequential number k outputted from the processor 103 in the order of $k = i, i+1, i+2, \ldots, m-1$.
4. Firstly, the value of $X_k$ stored in the register 106 is transferred through the bus 102 to the input register 108, and at the same time the constant value $\tau_k$ stored in the ROM 104 is transferred through the bus 101 to the other input register 107. The adder-subtracter 109 connected to the input register 108 and input register 107 substracts the value of $\tau_k$ from the value of $X_k$ to obtain the value $W = X_K - \tau_k$. The calculated result is doubled by the shifter 111 and is written in the register 106 as the value 2xW or $X_{k+1}$.

Next, the value of sign bit of the register 106 which corresponds to $a_{k+1}$ is inputted (or pushed) into the stacker 105. If the sign bit of the register 106 indicates positive, i.e., $W \geq 0$, the content 2xW of the register 106 is transferred to the register 108 according to a control signal 114 to set the update value $x_{k+1} = 2xW$. On the other hand, if the sign bit of the register 106 indicates negative, i.e., $W < 0$, the content $X_k$ of the register 108 is doubled by means of the shifter 110 according to a control signal 114 to return the result $2xX_k$ to the register 108 to thereby set the update value $X_{k+1} = 2xX_k$. After the completion of the repetition of step 4 from $k=i$ to $k=m-1$, the stacker 105 stacks the series $\{a_k\}$ ($k=i, i+1, \ldots, m$) and the register 106 is stored with the final value $X_m$.

5. For carrying out the pseudo multiplication, the value $X_m$ stored in the register 106 is used as the initial value $Y_m$, and the following step 6 is repeated with decrement of the sequential number k outputted from the processor 105 in the order of $k=m, m-1, m-2, \ldots i+1$.

6. The value of $Y_k$ stored in the register 106 is transferred to the input register 108 through the bus 102, and at the same time the value $Y_k$ of the register 106 is right-shifted (or multiplied by the facter $2^{-k}$) by the barrel shifter 113 with a given shift bit count which corresponds to the current content k of the processor 103 and the result is transferred to teh other input register 107.

If the value popped up from the stacker 105 on the First-In, Last-Out basis indicates positive, i.e., $a_k+1$, the adder-subtracter 109 arithmetically adds the value $Y_k$ and the value $2^{-k}xY_k$ to each other, and the result is multiplied by factor $\frac{1}{2}$ by the shifter 112. The thus obtained result is written into the register 106 as the updated value $Y_{k-1}$.

On the other hand, if the value popped up from the stacker 5 indicates negative, i.e., $a_k=0$, the adder-subtracter 109 adds the value $Y_k$ in the input register 108 and the value zero, the result is multiplied with the facter $\frac{1}{2}$ by the one-bit shifter 112, and the thus obtained result is written into the register 106 as the updated value $Y_{k-1} = Y_k/2$.

7. After the completion of the repetition of step 6 from $k=m$ to $k=i+1$, the register 106 is stored with the final value $Y_i$ which determines the fractional part of exponential function $e^x - 1$. As explained above, the calculation in the steps 4 and 6 is carried out by one clock, and therefore the needed total processing time is represented by clock number $2(m-i) \leq n$.

As described above, in this embodiment, a single barrel shifter, a single adder-subtracter and a stacker are utilized to calculate the value of exponential function $e^x - 1$ for the given value x at high speed and with high precision.

Floating point number is processed in the fore-mentioned embodiment, while fixed point number can be processed by the same hardware In such case, the variable i should be fixed to $i=0$, and the algorithm is modified as follows.

1. The initial value is set to $X_i = x(0 \leq x < +\infty)$. This means the conversion of x into the fixed point number $X_i$.

2. The variable i is set to $i=0$.

3-6. These procedures 3-6 are similar to the algorithm for the floating point number.

7. The value of exponential function $e^x - 1$ is obtained.

As explained above, the arithmetic unit for exponential function according to the present invention has the following two advantages. Firstly, the precision of calculated result is high. Namely, according to the inventive algorithm, since the calculation is carried out with adjusting bits to maximize the significant figure, the high precision of calculation can be achieved. In addition, when the values of x and $e^x - 1$ are in the floating point representation, even if the value of x is small, the significant figure is not reduced. Secondly, the calculation time can be greatly reduced. According to the inventive arithmetic unit, the process of STL method is carried out by means of the hardware. For this reason, the calculation time is reduced to 1/(calculation time needed for one loop procedure of the STL method) as compared to the conventional arithmetic unit controlled by micro program.

What is claimed is:

1. An arithmetic unit for carrying out sequentially arithmetic pseudo division and reverse-sequentially arithmetic pseudo multiplication according to algorithm based on *Sequential Table Lookup* method utilizing constant values $2^k x \log_e(1 + 2^{-k})$ so as to calculate value of exponential function $e^x - 1$ for a given value x, the unit comprising: generating means for sequentially generating the constant values $2^k x \log_e(1 + 2^{-k})$ from $k=0$ to $k=m-1$ where m is an positive integer number; an adder-subtracter controllable to selectively carry out arithmetic addition and subtraction; an output register connected to receive and store the arithmetic result from the adder-subtracter; a barrel shifter operative during the pseudo multiplication and connected to the output register for right-shifting a content thereof by shift bit count k where $k=1, 2 \ldots, m-2, m-1, m$; a pair of input registers connected to the adder-subtracter for inputting thereinto their contents to be processed thereby, one of the input registers being connected to the output register for receiving therefrom an updated content thereof, the other input register being connected to the generating means for receiving therefrom the constant value $2^k x \log_e(1 + 2^{-k})$ during the pseudo division and to the barrel shifter for receiving therefrom the right-shifted content of the output register during the pseudo multiplication; and stack means connected to the output register for stacking in First-In, Last-Out basis sign bit of the content of the output register, the stack means being operative during the sequential arithmetic pseudo division for controlling the adder-subtracter according to the value of sign bit to carry out the subtraction of the content of the other input register from the content of said one input register, and being operative during the sequential arithmetic pseudo multiplication for controlling the adder-subtracter according to the value of sign bit to selectively carry out the addition of a value zero or the content of the other input register to the content of said one input register.

2. An arithmetic unit as claimed in claim 1; including a pair of one bit shifters connected in parallel to each other between the adder-subtracter and the output register, one of the one-bit shifters being operative during the pseudo division for doubling the arithmetic result from the adder-subtracter, and the other one-bit shifter being operative during the pseudo multiplication for multiplying the arithmetic result from the adder-subtracter by factor $\frac{1}{2}$.

3. An arithmetic unit as claimed in claim 1; including a one-bit shifter operative during the pseudo division for multiplying the content of said one input register by factor $\frac{1}{2}$ according to the value of sign bit of the output register.

4. An arithmetic unit as claimed in claim 1; including a processor for sequentially and reverse-sequentially producing the sequential number k effective to control sequentially the arithmetic process of the unit.

* * * * *